March 31, 1959     E. HOSTETLER     2,879,743

LIQUID DISPENSING DEVICE

Filed Sept. 17, 1956     4 Sheets-Sheet 1

INVENTOR.
ELDON HOSTETLER

BY Maurice A. Weikart

ATTORNEY

March 31, 1959 E. HOSTETLER 2,879,743
LIQUID DISPENSING DEVICE
Filed Sept. 17, 1956 4 Sheets-Sheet 2
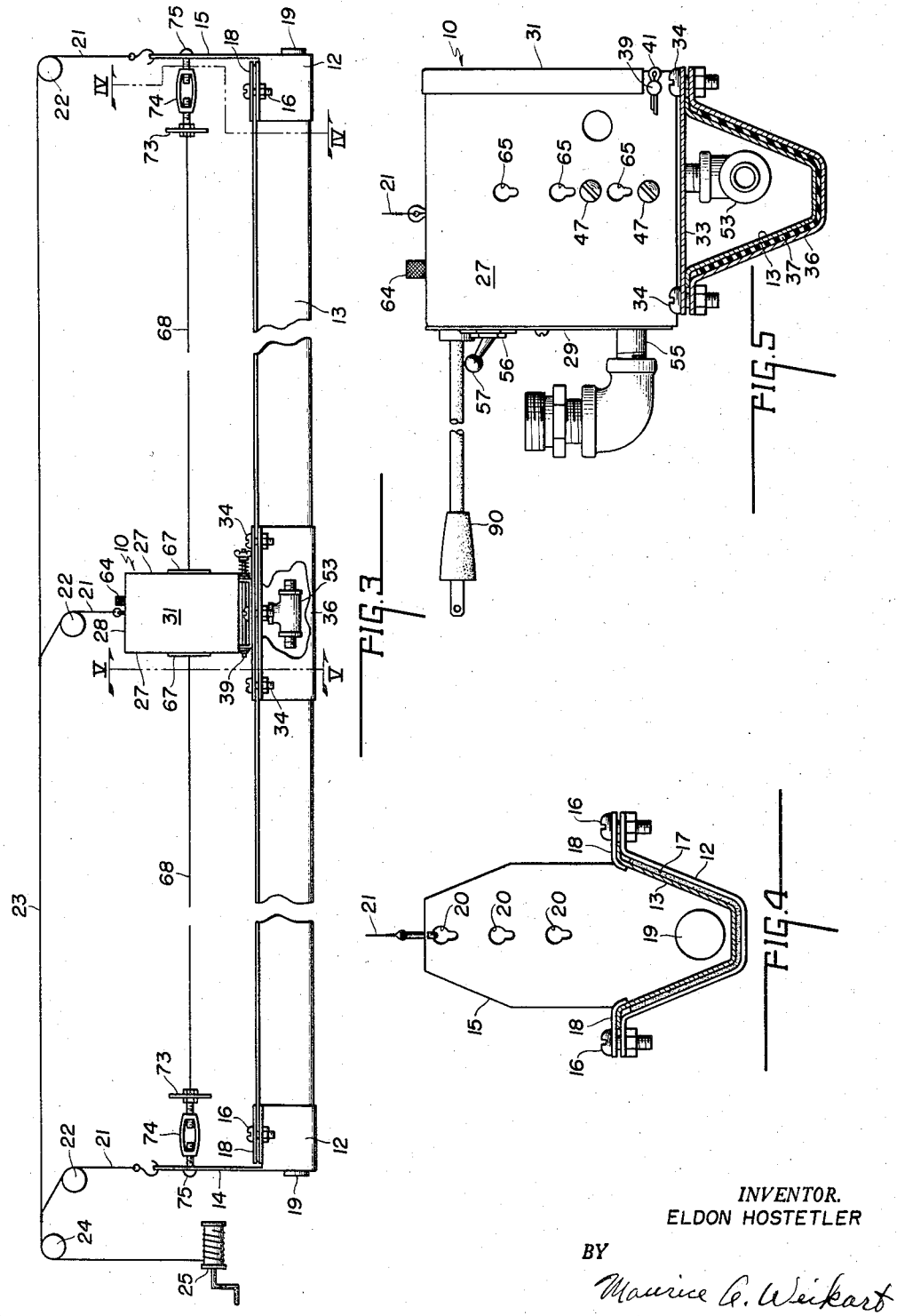
INVENTOR.
ELDON HOSTETLER
BY Maurice A. Weikart
ATTORNEY March 31, 1959

E. HOSTETLER 2,879,743

LIQUID DISPENSING DEVICE

Filed Sept. 17, 1956

INVENTOR.
ELDON HOSTETLER
BY
Maurice A. Weikart
ATTORNEY

March 31, 1959     E. HOSTETLER     2,879,743
LIQUID DISPENSING DEVICE

Filed Sept. 17, 1956     4 Sheets-Sheet 4

INVENTOR.
ELDON HOSTETLER
BY
Maurice A. Weikart
ATTORNEY

United States Patent Office 2,879,743
Patented Mar. 31, 1959

2,879,743

LIQUID DISPENSING DEVICE

Eldon Hostetler, Middlebury, Ind.

Application September 17, 1956, Serial No. 610,113

8 Claims. (Cl. 119—81)

This invention relates generally to water or other liquid dispensing devices and in particular to poultry watering devices in which water is metered into an elongated receptacle, or trough, as a function of the weight, and therefore the quantity of water therein.

In domestic animal watering devices it is customary to meter water into the trough by means of a float actuated inlet valve, responsive to the water level in the trough. Such an arrangement has proven to be not entirely satisfactory. Float operated valves are particularly subject to blocking or jamming of the float by accumulated litter and to deterioration, by corrosion, of the actuating linkage between the float and the valve. Further difficulty arises from the fact that the rate of emptying of the trough by drinking poultry may be rather slow and as the water level reaches the point where the inlet valve is cracked slightly open, a small quantity of water will be slowly admitted to the trough and the inlet valve will again be closed. The movement of water into the trough takes place slowly and without turbulence because of the throttling effect of the inlet valve. During heavy drinking periods, the inlet valve will assume an open position in which the flow of water into the trough just equals the removal rate from the trough; even during such periods the admission of water to the trough is such that little turbulence is created, and accumulated litter is not washed away to the extremities of the trough. The consequent accumulation of litter tends to clog the action of the float, and the acidic fumes generated by the wetted litter causes sticking and deterioration of the float to valve linkage.

An object of the present invention is to provide a poultry, or other domestic animal, watering device which utilizes the weight of water, rather than a float, to actuate an electrically energized inlet valve, and in which the point at which water is admitted to the trough to bring the water level back up to the shut-off point is reached only after considerably water has been removed from the trough, thereby providing a flushing action along the length of the trough.

A further object is to provide such a device in which easily accessible adjustment means permit simultaneous adjustment of both the valve-open water level and the valve-closed water level in either direction over a range of valves, and further permits adjustment of the differential between the valve-open water level and the valve-closed water level.

A further object is to provide a poultry watering device which admits a water jet to the trough along the longitudinal axis of the trough to effect a flushing action in the trough with each operation of the inlet valve.

A further object is to provide a poultry watering device having an elongated trough with removable plugs at each of its extremities to faciltate cleaning of the trough.

A further object is to provide a poultry watering device using an electrically energizable inlet valve, integrated into the circuit of which is an electrical anti-roost device.

A further object is to provide a poultry watering trough utilizing as an anti-roost device spaced, uninsulated wires, differing in electrical potential, and in overlying relation to the trough, the height of the wires in relation to the trough being adjustable.

A further object is to provide a poultry watering device utilizing a sectionalized trough, having a control housing mounted intermediate the ends of one of the sections, and having means for adjustable overhead support of each section of the trough and the control housing.

These and other objects will be apparent from the following detailed description of the preferred embodiment of the invention which corresponds to the drawings, in which:

Fig. 3 represents a side view of the device shown in Fig. 1.

Fig. 4 represents a view taken generally along the line IV—IV of Fig. 3.

Fig. 5 is a view of the control housing, similar to Fig. 2, and taken generally along the line V—V of Fig. 3.

Figure 1:
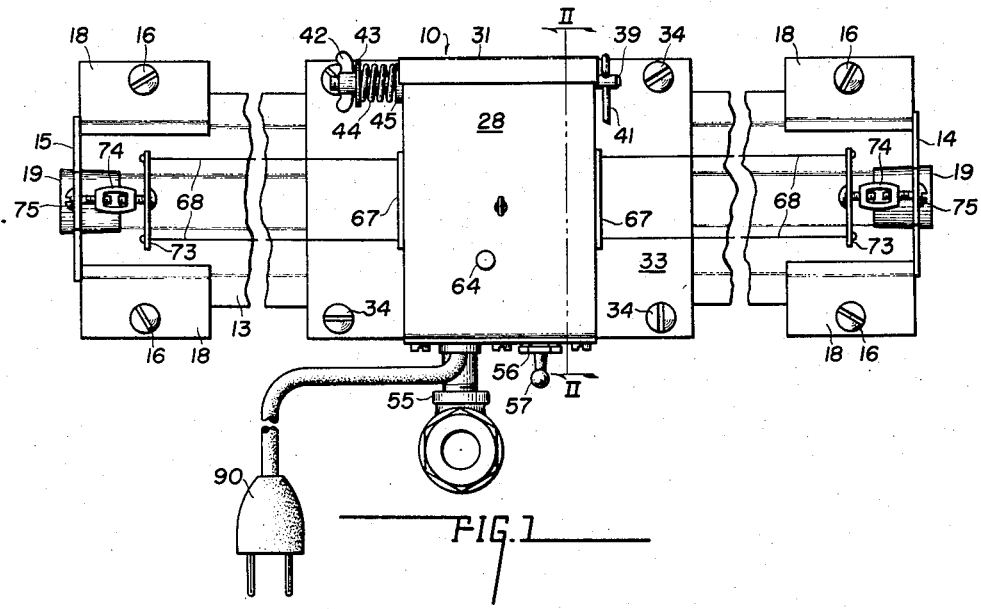
Fig. 1 represents a top view of the preferred embodiment of the invention.

Referring initially to Figs. 1, 3 and 4, shown at 13 is an elongated channel shaped receptacle or trough having end plates 14 and 15 formed at their lower portions to fit about the ends of the trough 13 and held in water tight relation therewith by means of bolts 16, gasket member 17 (Fig. 4) underlying bracket 12, and clamp members 18. The endplates 14 and 15 carry removable plugs 19 which seal openings in the endplates adjacent the web portion of the channel shaped trough. The endplates 14 and 15 have vertically spaced key-shaped holes 20 therein, the upper holes on each of the endplates serving as connectors for support cables to be subsequently described.

As may best be seen in Fig. 3, there is mounted centrally on the trough 13 a control housing indicated generally at 10. Endplates 13 and 14 and control housing 10 are each suspended by means of cables 21, which in turn are passed over pulleys 22 and attached to main cable 23. Main cable 23 passes over pulley 24 and then mounted on the hand winch shown schematically at 25. It will be apparent that adjustment of the hand winch provides a convenient means for varying the height of suspension of trough 13 and control housing 10, and that these members may thus be raised or lowered to the optimum height above the floor for the size of the poultry using the trough. It will be further apparent that this method of mounting the trough obviates the use of legs or other means of support on the floor of the building housing the poultry thus avoiding the difficulty of rust and corrosion of the support legs and permitting the trough to be raised overhead and out of the way when not in use.

Control housing 10 is formed as a bottomless rectangular box having side plates 27, top plate 28, and end plates 29 and 31. Plate 29 is secured to a flanged marginal portion of top plate 28 and end plates 29 and 31 by means of screws 32 (Fig. 2), and endplate 31 has flanged over sides and top which have a sliding fit over the top plate 28 and side plates 27.

Trough 13 just beneath housing 10 carries a plate 33 which bridges the top of the trough and is secured thereto by means of screws 34 and trough-underlying bracket 36. It will be understood that the trough can be continuous under the bracket 36 or can comprise two butt-jointed sections in which case the gasket member 37 can be provided to provide a water tight seal at the joint. Plate 33 has formed integrally therewith upstanding ears 38 having central openings through which extends a pivot pin 39. Pin 39 further extends through corresponding openings in the side plates 27 and at one end carries a cotter key 41 and at its other end a wing-nut 42, a washer 43, compression spring 44 and a spring retainer 45. It will be apparent that by adjusting wing nut 42 and consequently the compressional force exerted by spring 44, the frictional resistance to pivotal movement of the connection between housing 10 and plate 33 may be varied.

Figure 2:
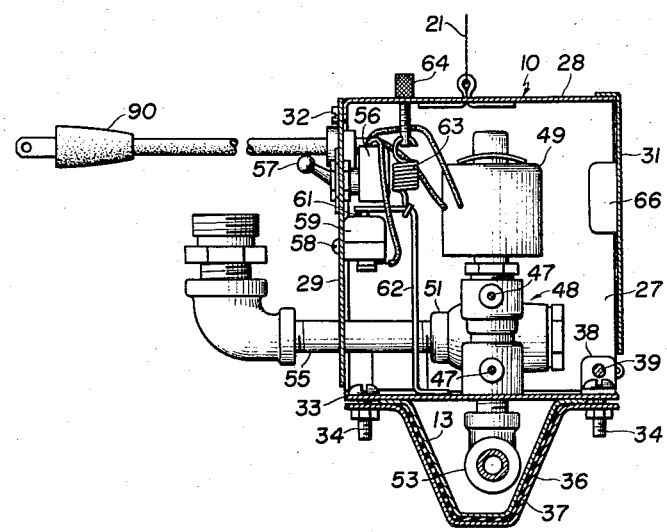
Fig. 2 represents a view taken generally along the lines II—II of Fig. 1.

As may best be seen in Fig. 2, there is mounted to side plate 27, by means of screws 47, an electrically energizable valve 48 which may take the form of a normally closed solenoid valve of conventional type, such as that disclosed in Schell Patent 2,574,762. Valve 48 has a solenoid actuator 49, an inlet 51 and an outlet 52. Suitable piping 55 extends from valve inlet 51 adapted to be connected to a water supply which may be a conventional domestic water system providing water at a pressure of the order of 40 pounds per square inch. Valve outlet 52 has connected thereto a T fitting 53, the outlet axis of which coincides generally with the central, longitudinal axis of trough 13. It will be understood that if control housing 10 were mounted adjacent one end of trough 13, rather than centrally as shown, the outlet fitting 53 would take the form of an elbow fitting, having its discharge axis generally along the central, longitudinal axis of trough 13.

Mounted on endplate 29 (Fig. 2) is a conventional manually operated toggle switch 56, having a manual actuating member 57 accessible from outside the control housing. Adjacent switch 56 on the sideplate 29 there is mounted by means of screws 58 a normally closed, enclosed snap switch 59 of a conventional type such as that disclosed in McGall Patent 1,960,020, having an actuating button 61. Button, or pin, 61 cooperates with a horizontal portion of an upstanding link member 62 welded, or otherwise rigidly fastened to the upper face of plate 33. A tension spring 63 has one of its ends fastened to the member 62 and its other end is carried by a knurled screw 64 threaded through an appropriate opening in top plate 28. Carried by endplate 31 is a conventional step-down transformer 66, the circuit connections and function of transformer 66 being later edscribed. From the foregoing it will be apparent that the control housing 10 has a pivotal connection to the margin of trough 13, and that the tendency of the free side of trough 13 to fall away from housing 10 is resisted by spring 63 through member 62.

Figure 6:
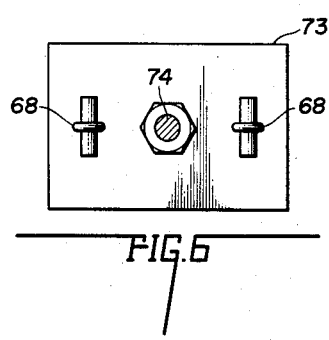
Fig. 6 is a front view of one of the mounting members for the anti-roost wires.
Figure 7:
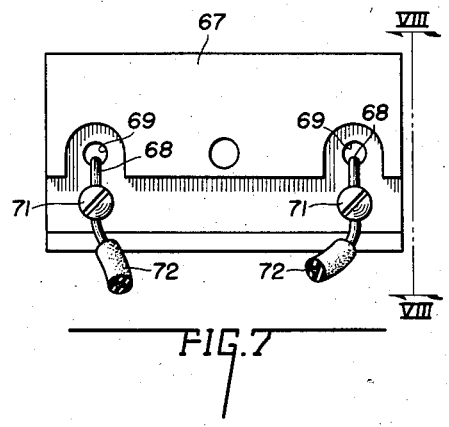
Fig. 7 is a rear view of another of the mounting members for the anti-roost wires.
Figure 8:
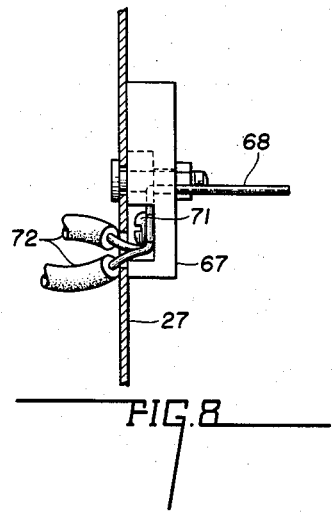
Fig. 8 is a view of the member shown in Fig. 7 taken generally along the line VIII—VIII of Fig. 7.
Figure 10:
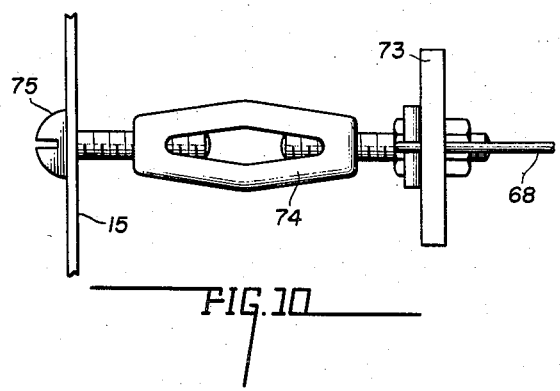
Fig. 10 is a side view member which fastens the anti-roost wires to the trough end.

As may best be seen in Fig. 5, sideplates 27 have a vertical row of spaced key-shaped openings 65 therein into any one of which may be removably hooked an anti-roost wire mounting member 67, formed of suitable electrical insulating material, shown in detail in Figs. 7 and 8. Dual spaced, uninsulated, anti-roost wires 68 extend in overlying relation to trough 13 and pass through openings 69 in member 67 and are fastened to screw terminals 71 in a recessed portion of the inner face of member 67. Also connected to terminals 71 are wires 72 (Fig. 8), which are in turn connected to the secondary of the transformer 66, as will subsequently be described. The opposite ends of the wires 68 terminate in a member 73 (Figs. 6 and 10) formed of suitable insulating material, and carried by a conventional turnbuckle 74 (Fig. 10), having a head 75 which may be hooked into one of the openings 20 in the trough endplate 15. It will be apparent that the turnbuckle 74 provides a means for tightening wires 68 over the trough 13, and that the height at which wires 68 overlie trough 13 may be adjusted according to which of the openings 65 and 20 in endplate 15 and sideplate 27, respectively the members 67 and 73 are fastened. It will be further understood that a similar arrangement for anti-roost wires extends between the trough endplate 14 and housing sideplate 27.

Figure 9:
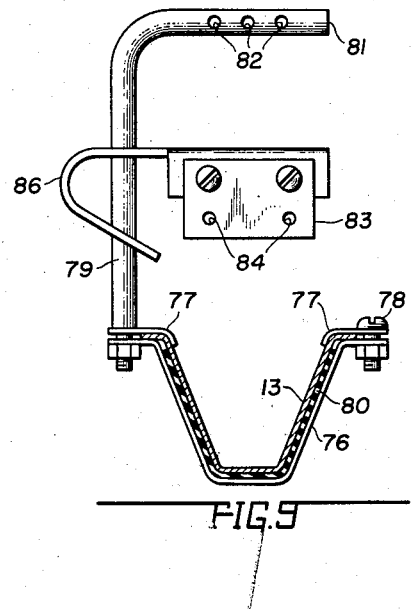
Fig. 9 is sectional view of the trough, similar to Fig. 4, but showing the suspension member and anti-roost wire carrier used when the trough is composed of more than one section.
Figure 11:
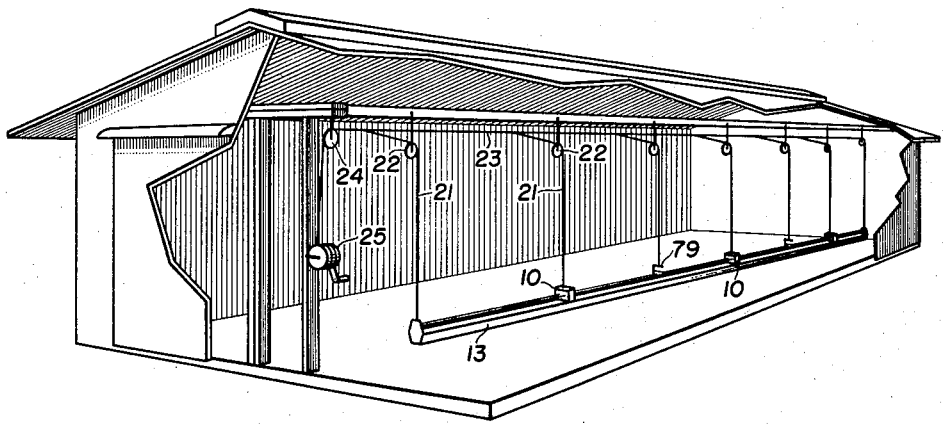
Fig. 11 is a perspective view of the sectionalized version of the poultry water device as installed.

As may best be seen in Fig. 11, if multiple or sectionalized units of the trough are to be used, the intersection sealing and support means may be formed as shown in Fig. 9 in which a bracket 76 underlies trough 13 and is clamped thereto by clamping members 77 and screws 78 and 79, the gasket member 80 forming a water tight seal between the butting ends of the trough sections. Screw 79 is formed with an L-shaped extension having a horizontal leg 81 overlying the trough 13 and having openings 82 therein, any one of which may receive a connecting member carried by one of the support cables. It will be understood that when such a sectionalized trough arrangement is utilized, means must be provided for supporting the anti-roost wires which extend unbroken between the control units 10. Such adjustable height support is provided by the member 83, formed of suitable insulating material and having anti-roost wire receiving holes 84 therein and mounted on a flanged portion of a U-shaped spring clip 86, having spaced openings in its legs for receiving the shank of screw 79. Since the legs of the clip 86 are biased away from each other, it will be apparent that by manually pressing the legs toward each other, the clip 86 may be adjustably moved up or down the shank of screw 79 to appropriately position the anti-roost wire support member 83.

Figure 12:
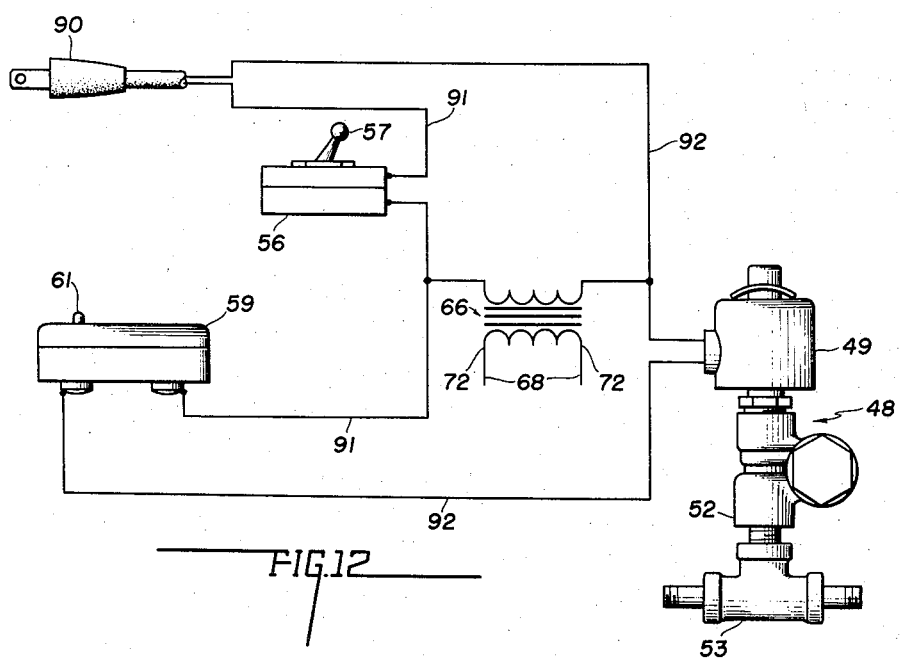
Fig. 12 is a schematic drawing of the wiring circuit for the poultry watering device.

Fig. 12 illustrates schematically the wiring circuit of the preferred embodiment of the invention. Reference numeral 90 identifies a conventional plug for connection to a 110 volt domestic electrical supply. From plug 90 bus wires 91 and 92 extend to the trough operated switch 59. Connected in wire 91 is manually operated toggle switch 56, and in wire 92 is the electromagnetic operator 49 for the valve 48. The transformer 66 is connected across wires 91 and 92 and controlled by switch 56, but is independent of switch 59. Anti-roost wires 68 are connected across the secondary of transformer 66 by means of lead wires 72. It will be apparent that operation of the manual switch 56 energizes transformer 66, and consequently anti-roost wires 68, and that after closing of switch 56, energization of valve 48 is dependent on the operation of trough operated switch 59.

*Operation*

Referring initially to Fig. 2, with the valve 48 connected to a source of water and with the electrical circuit energized, when switch 56 is manually moved to closed position, because trough 13 is empty it will be in its uppermost position with relation to control housing 10 and will be held there by the force exerted by spring 63. Link 62 will be in engagement with the button, or thrust pin 61, but will permit it to assume its extended position, in which position switch 59 is closed. Operator 49 will therefore be energized and valve 48 will be opened admitting a jet of water from the fitting 53 to the trough and directing its flow along the longitudinal axis of the trough. As the trough fills the water level therein will reach a height where the weight of the water in the trough will be sufficient to progressively overcome the force exerted by the spring 63, moving the link 62 and the trough downwardly until the link 62 depresses the pin 61, opening switch 59 and consequently closing the valve 48 shutting off the flow of water to the trough.

Adjustment of the tension of spring 63, by means of screw 64, the head of which is accessible from outside the control housing, will simultaneously adjust the switch-off level and the switch-on level of the water in the trough. Increasing the compressional force exerted by spring 44, by adjustment of wing-nut 42, will increase the frictional resistance to pivotal movement of the trough about pin 39, and will consequently increase the differential in water level or water weight necessary to move switch 59 between its open and closed positions. Decreasing the compressional force exerted by spring 44 will, of course, narrow the operating differential of the system. It will be apparent that under conditions in which the trough may be heavily littered or clogged, the differential between the water-on level and the water-off level will need to be relatively wide, so that the trough will be emptied to a low level and a relatively large quantity of water then admitted as a jet to accentuate the flushing action of the accumulated litter to the ends of the trough retaining the central portion of the trough free of debris. This adjustment of the water level differential can be made to accommodate the varying conditions under which the watering device may be operated.

As mentioned previously, and as will be apparent from the arrangement in Fig. 11, the trough may be adjustably raised or lowered by means of winch 25 and the watering device may be assembled in sectional units using multiple control units 10. It will be understood that each of the control units will be operated by the weight of water contained in the trough portion extending between the cable supports on either side of the respective control unit 10 and that operation of the multiple units will be otherwise the same as that referred to previously.

Anti-roost wires 68 are energized with the closing of manual switch 56 and remain energized independently of the operation of valve 48, and the height at which wires 68 overlie trough 13 may be adjustably varied as previously explained.

From the foregoing it will be apparent that there is provided an electrically operated watering device in which water is admitted to the receptacle, or trough, with a jet flushing action, without use of floats, in which the water level differential can be adjusted to accommodate various conditions of operation, utilizing an electrical anti-roost arrangement and an overhead support means.

Modifications of the preferred embodiment of the invention here disclosed may occur to those skilled in the art, the scope of the invention is therefore to be limited solely by the appended claims.

What is claimed is:

1. In combination with an elongated trough for delivering fluid material for animal consumption, a freely hanging support for said trough, said trough being pivotally mounted along one lateral edge and intermediate its ends to said support and depending therefrom, the axis of the pivotal juncture of the support member and the receptacle extending parallel to the longitudinal axis of the receptacle on said support, a supply conduit, a conduit having an end portion discharging into said trough and producing at least one jet directed longitudinally of said trough, the other end of said conduit being connected to said supply conduit, a quick-acting full-flow valve between said conduits, means sensitive to the weight of fluid in said trough for controlling the opening and closing action of said full-flow valve mounted on said support whereby when the fluid in said trough becomes low, the valve will be activated to cause a quick full flow of fluid into said trough.

2. In combination with an elongated trough for delivering fluid material for animal consumption, a support for said trough, said trough being pivotally mounted on said support along one lateral edge portion, a supply conduit, a conduit having an end portion discharging into said trough and producing at least one jet directed longitudinally of said trough, the other end of said conduit being connected to said supply conduit, a quick-acting full-flow valve between said conduits, and weight-sensitive means in operative fluid-controlling relationship relative to said valve and said trough.

3. The combination as recited in claim 2 in combination with an overhead support for said trough support and a plurality of interconnecting suspension means whereby said trough support may be supported by said overhead support and means for uniformly and simultaneously adjusting the length of said suspension means whereby the entire length of said trough may be readily adjusted relative to said overhead support.

4. The combination as recited in claim 2 in which removable plugs are disposed in opposed ends of said trough for facilitating flush cleaning thereof.

5. The combination as recited in claim 2 in combination with anti-roost means comprising parallel spaced uninsulated wires having an electrical potential difference therebetween disposed between said trough support and trough ends and spaced from the top of said trough.

6. The combination as recited in claim 2 in which said trough is composed of a plurality of sections arranged in end-to-end abutting relationship, said trough sections defining a smooth continuous internal trough surface.

7. The combination as recited in claim 2 in combination with means supported by said trough support for adjusting the frictional resistance to pivotal movement of the trough about its pivot whereby the fluid weight necessary to effect pivotal movement of the trough may be varied.

8. In combination with an elongated trough for delivering fluid material for animal consumption, a supply conduit, a conduit having an end portion discharging into said trough and producing at least one jet directed longitudinally of said trough whereby any foreign matter disposed in said trough is washed to the ends thereof, the other end of said conduit being connected to said supply conduit, a freely hanging support for said trough, said trough being pivotally connected along one lateral edge portion to said support and depending therefrom, resiliently biased linkage means supported by said trough support and supporting said trough for resisting the tendency of the free side of the trough to fall away from said trough support, the positions of said linkage means and trough relative to said trough support being responsive to the amount of fluid material in said trough, a quick-acting full-flow valve disposed between said conduits, control means for said valve in communication therewith actuated by said linkage means whereby the valve will be activated to cause a quick full flow of fluid into said trough when the fluid level therein reaches a predetermined low level and will be activated to cause a complete cessation of flow of fluid when the fluid level therein reaches a predetermined height.

References Cited in the file of this patent

UNITED STATES PATENTS

| | | |
|---|---|---|
| 817,448 | Shanahan | Apr. 10, 1906 |
| 1,798,208 | Kratzer | Mar. 31, 1931 |
| 1,852,975 | Kratzer | Apr. 5, 1932 |
| 2,620,829 | Tolley | Dec. 9, 1952 |
| 2,628,630 | Collins | Feb. 17, 1953 |
| 2,643,637 | Lewis | June 30, 1953 |
| 2,708,435 | Lewis | May 17, 1955 |
| 2,716,423 | Landgraf | Aug. 30, 1955 |
| 2,727,492 | Hatcher | Dec. 20, 1955 |